(12) United States Patent
Yamauchi et al.

(10) Patent No.: US 7,946,715 B2
(45) Date of Patent: May 24, 2011

(54) LIGHT SOURCE AND PROJECTOR

(75) Inventors: Kentaro Yamauchi, Matsumoto (JP);
Tetsuo Terashima, Chino (JP); Takeshi Takezawa, Matsumoto (JP); Kazuo Okawa, Matsumoto (JP); Keishi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 467 days.

(21) Appl. No.: 12/237,746

(22) Filed: Sep. 25, 2008

(65) Prior Publication Data

US 2009/0085495 A1    Apr. 2, 2009

(30) Foreign Application Priority Data

Sep. 28, 2007   (JP) .................................. 2007-253627

(51) Int. Cl.
*G03B 21/20* (2006.01)
*H05B 37/02* (2006.01)

(52) U.S. Cl. .......... 353/85; 315/246; 315/291; 315/308; 315/360

(58) Field of Classification Search .................. 315/246, 315/291, 307, 308, 360; 353/85
See application file for complete search history.

(56) References Cited

U.S. PATENT DOCUMENTS

| | | | |
|---|---|---|---|
| 6,232,725 | B1 | 5/2001 | Derra et al. |
| 6,750,620 | B2 * | 6/2004 | Suzuki .......................... 315/291 |
| 6,888,321 | B2 * | 5/2005 | Arimoto et al. ............... 315/289 |
| 7,355,355 | B2 * | 4/2008 | Okamoto ..................... 315/291 |
| 2002/0011803 | A1 | 1/2002 | Derra et al. |
| 2004/0000880 | A1 | 1/2004 | Ozasa et al. |
| 2006/0066261 | A1 | 3/2006 | Rahmane et al. |
| 2009/0256491 | A1 | 10/2009 | Brückel et al. |

FOREIGN PATENT DOCUMENTS

| | | |
|---|---|---|
| DE | 10 2005 049 582 A1 | 4/2007 |
| EP | 1 152 645 A1 | 11/2001 |
| EP | 1 885 164 A2 | 2/2008 |
| JP | A-2003-264094 | 9/2003 |
| JP | A-2004-039563 | 2/2004 |
| JP | A-2005-209572 | 8/2005 |

(Continued)

OTHER PUBLICATIONS

Annex to the European Search Report issued in corresponding European Patent Application No. 08 25 3141 issued Nov. 10, 2009.

(Continued)

*Primary Examiner* — Thuy Vinh Tran
(74) *Attorney, Agent, or Firm* — Oliff & Berridge, PLC

(57) ABSTRACT

A light source includes an discharge lamp including a first electrode and a second electrode emitting light by discharge between them, a drive unit performing a steady operation which supplies steady energy to the first and second electrodes and an initial operation which supplies energy to the first and second electrodes with an operation different from the steady operation before performing the steady operation, a determination unit determining states of the discharge lamp and a data storage unit storing plural initial power feeding conditions provided corresponding to states of the discharge lamp as examples of the initial operation and plural steady power feeding conditions provided corresponding to the states of the discharge lamp as examples of the steady operation, in which the drive unit performs the initial operation in any one of conditions selected from the plural initial power feeding conditions according to a determination result by the determination unit and performs the steady operation in any one of conditions selected from the plural steady power feeding conditions according to a determination result by the determination unit.

12 Claims, 11 Drawing Sheets

FOREIGN PATENT DOCUMENTS

| | | |
|---|---|---|
| JP | A-2005-276623 | 10/2005 |
| JP | A-2005-310484 | 11/2005 |
| JP | A-2005-353357 | 12/2005 |
| JP | A-2006-236634 | 9/2006 |
| WO | WO 2004/066687 A1 | 8/2004 |
| WO | WO 2006/016335 A1 | 2/2006 |

OTHER PUBLICATIONS

Examination Results mailed Mar. 1, 2011 in European Application No. 08 253 141.9.

* cited by examiner

LIGHT SOURCE AND PROJECTOR

BACKGROUND

1. Technical Field

The invention relates to a light source including a discharge lamp which has a pair of electrodes and a projector in which such light source is incorporated.

2. Related Art

The state of a discharge lamp which is incorporated in a discharge light-emitting type light source varies with operating time and, especially, an electrode varies its shape with time because it is consumed during lighting. The crystallization state or an impurity content of tungsten which is a component of the electrode also varies with time. A drive method of adjusting a drive waveform at the steady state by detecting the variation of states as the above by lamp voltage and the like, or a drive method of adjusting a drive waveform according to operating accumulated time by monitoring the operating accumulated time are disclosed. Examples of the related art include WO2004/066687, JP-A-2005-276623, JP-A-2004-39563, JP-A-2003-264094, JP-A-2005-310484, and JP-A-2005-209572 (Patent Document 1 to 6).

However, the above drive methods are to be performed after electric power reaches a rated value, therefore, there are some cases in which flicker occurs earlier or the life of the electrode is shorten because of insufficient control of the state of the electrode before reaching the rated value. That is, it is becoming clear that progress stages of deterioration of the electrode largely varies according to the setting of a drive waveform in initial operations until electric power reaches the rated value, accordingly, it is necessary to adjust initial operations before reaching the rated value and a steady operation after reaching the rated value in a comprehensive manner.

SUMMARY

An advantage of some aspects of the invention is to provide a light source and a projector which incorporating the light source, which can appropriately adjust initial operations before electric power reaches a rated value and a steady operation after reaching the rated value and suppress deterioration of characteristics.

A light source according to an aspect of the invention includes (a) an discharge lamp including a first electrode and a second electrode emitting light by discharge between them, (b) a drive unit performing a steady operation which supplies steady energy to the first and second electrodes and an initial operation which supplies energy to the first and second electrodes with an operation different from the steady operation before performing the steady operation, (c) a determination unit determining states of the discharge lamp and (d) a data storage unit storing plural initial power feeding conditions provided corresponding to states of the discharge lamp as examples of the initial operation and plural steady power feeding conditions provided corresponding to the states of the discharge lamp as examples of the steady operation, in which (b1) the drive unit performs the initial operation in any one of conditions selected from the plural initial power feeding conditions according to a determination result by the determination unit and performs the steady operation in any one of conditions selected from the plural steady power feeding conditions according to a determination result by the determination unit.

In the above light source, the initial operation is performed by the drive unit in any one of conditions selected from the plural initial power feeding conditions according to the determination result by the determination unit and the steady operation is performed by the drive unit in any one of conditions selected from the plural steady power feeding conditions according to the determination result by the determination unit, therefore, the initial operation and the steady operation are appropriately executed in accordance with states of the discharge lamp. Accordingly, the light emission state of the discharge lamp can be maintained in a good state with less flicker or the like over a long period of time, which can increase the life of the discharge lamp.

According to a specific aspect or a viewpoint of the invention, in the light source, the drive unit switches the initial operation and the steady operation according to the determination result by the determination unit independently. In this case, the initial operation and the steady operation can be appropriate respectively, and respective stages of operations in the light source can be respectively adjusted so as to correspond to states of discharge lamp.

According to another aspect of the invention, the plural initial power feeding conditions includes plural stages corresponding to determination results by the determination unit, and when the initial operation is switched according to the determination result by the determination unit, supplying energy to be supplied to the first electrode and the second electrode respectively is changed. In this case, the content of the initial operation can be positively adjusted according to the supplying energies of plural stages.

According to further another aspect of the invention, the plural initial power feeding conditions correspond to plural stages of deterioration of the discharge lamp, in which an current value of the initial power feeding condition corresponding to a higher stage of deterioration of the discharge lamp is smaller than an current value of the initial power feeding condition corresponding to a lower stage of deterioration of the discharge lamp in a period of a starting operation provided at the beginning of the initial operation. In this case, the tendency in which arc discharge is liable to be formed at a sealed portion from needle crystals formed at the root side of the electrodes in the initial operation can be suppressed, which prevents the deterioration of the discharge lamp from proceeding earlier.

According to further another aspect of the invention, the initial operation includes a rising operation performed after the starting operation, in which the plural initial power feeding conditions corresponds to plural stages of deterioration of the discharge lamp, and an increasing amount of an current value of the initial power feeding condition corresponding to a higher stage of deterioration of the discharge lamp is larger than the increasing amount of an current value of the initial power feeding condition corresponding to a lower stage of deterioration of the discharge lamp at the end of the rising operation period in the initial operations. In this case, even when projections and depressions formed in the vicinity of protrusions at the tip side of electrodes are difficult to be melted by deterioration with time, projections and depressions can be positively melted. It is also possible to suppress the tendency that protruding tip portions are difficult to be grown with time at the steady operation, which prevents deterioration of the discharge lamp from proceeding earlier.

According to further another aspect of the invention, the plural steady power feeding conditions correspond to plural stages of deterioration of the discharge lamp, in which electric power of the steady power feeding condition corresponding to a higher stage of deterioration of the discharge lamp is larger than electric power of the steady power feeding condition corresponding to a lower stage of deterioration of the discharge lamp, which is supplied in a latter half period of a half cycle in alternating-current power to be supplied to the first electrode and the second electrode respectively. In this case, it is possible to grow or maintain tip portions while projections and depressions formed at the tip portions of the first electrode and the second electrodes are melted at the initial stage. At this time, even when projections and depressions formed at the tip portions of the electrodes are difficult to be melted by deterioration with time, the projections and depressions can be positively melted. It is also possible to suppress the tendency that protruding tip portions are difficult to be grown with time at the steady operation.

A projector according to an aspect of the invention includes (a) the above light source, (b) a light modulator illuminated by illumination light from the light source and (c) a projection system projecting images formed by the light modulator.

In the above projector, since the above-described light source is used, a projector in which it is not necessary to change the light source for a long period of time and good images are projected can be realized according to the discharge lamp having long life while maintaining the light emitting state of the discharge lamp in a good state with less flicker or the like over a long period of time.

BRIEF DESCRIPTION OF THE DRAWINGS

The invention will be described with reference to the accompanying drawings, wherein like numbers reference like elements.

FIG. 10 is a flowchart explaining operations of the light source shown in FIG. 1 and the like.

DESCRIPTION OF EXEMPLARY EMBODIMENTS

First Embodiment

Hereinafter, a configuration, operations and the like of a light source according to a first embodiment of the invention will be explained with reference to the drawings.

Figure 1:
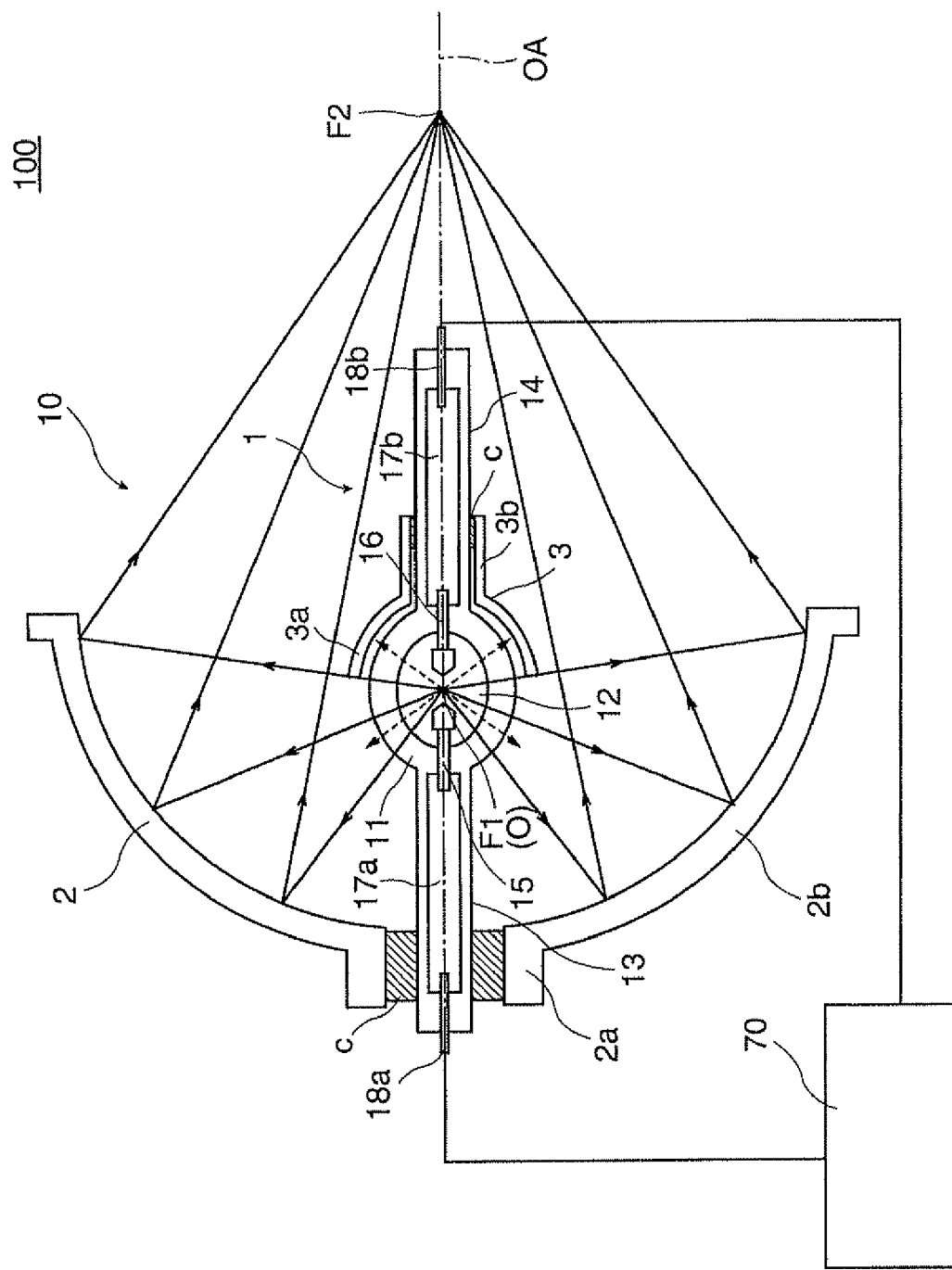
FIG. 1 is a cross-sectional view explaining a light source according to a first embodiment.

FIG. 1 is a cross-sectional view conceptually explaining a configuration of a light source 100. In the light source 100, a light source unit 10 which is a discharge lamp includes a discharge light-emission type discharge lamp 1, a reflector 2 which is an oval main reflection mirror and a sub-mirror 3 which is a spherical sub-reflection mirror. A light source driver 70 is an electrical circuit for allowing the light source unit 10 to emit light in a desired state by supplying alternating current to the light source unit 10, which will be described later in detail.

In the light source unit 10, the discharge lamp 1 is formed by a light-transmissive quarts glass tube the center of which is expanded in a spherical shape, including a body portion 11 which is a sealed body emitting light for illumination and a first and second sealed portions 13, 14 extending along an axis passing through both ends of the body portion 11.

In a discharge space 12 formed inside the body portion 11, a tip portion of a first electrode 15 made of tungsten and a tip portion of a second electrode 16 also made of tungsten are arranged at an interval of a predetermined distance, into which gas which is a discharge medium including a noble gas, a metal halide and the like is sealed. Metal foils 17a, 17b made of molybdenum which are electrically connected to root portions of the first and second electrodes 15, 16 provided at the body portion 11 are inserted into respective sealed portions 13, 14 extending to both ends of the body portion 11, and the both sealed portions 13, 14 are sealed tightly with respect to the outside by themselves or a glass material and the like. When AC voltage is applied to lead wires 18a, 18b connected to the metal foils 17a, 17b by the light source driver 70, arc discharge occurs between a pair of electrodes 15, 16 and the body portion 11 emits light with high luminance. As can be seen from FIG. 1, the reflector 2 is arranged at the first electrode 15 side, and the sub-mirror 3 is arranged at the second electrode 16 side, facing the reflector 2.

Almost half of the body portion 11 of the discharge lamp 1 at the front luminous-flux exiting side is covered with the sub-mirror 3. The sub-mirror 3 is an integral-molded product, which is made of quartz glass, including sub-reflection portion 3a returning luminous flux projected in the front direction from the body portion 11 of the discharge lamp 1 to the body portion 11 and a supporting portion 3b fixed around the second sealed portion 14 in a state of supporting a root portion of the sub-reflection portion 3a. The supporting portion 3b allows the second sealed portion 14 to be inserted therein as well as supports the sub-reflection portion 3a in a state of being aligned with respect to the body portion 11.

The reflector 2 is an integrally-molded product, which is made of crystallized glass or quarts glass, including a neck portion 2a into which the first sealed portion 13 of the discharge lamp 1 is inserted and a main reflection portion 2b having an oval curved surface expanding from the neck portion 2a. The neck portion 2a allows the first sealed portion 13 to be inserted therein as well as supports the main reflection portion 2b in a state of being aligned with respect to the body portion 11.

The discharge lamp 1 is arranged along a system optical axis OA corresponding to an optical axis of the main reflection portion 2b as well as arranged so that a light emitting center O between the first and second electrodes 15, 16 in the body portion 11 corresponds to a position F1 which is a first focal point of the oval curved surface of the main reflection portion 2b. When the discharge lamp 1 is lighted, a light flux projected from the body portion 11 is reflected at the main reflection portion 2b, or reflected at the sub-reflection portion 3a, then, further reflected at the main reflection portion 2b to be the light flux converging to a position F2 which is a second focal point of the oval curved surface. That is, the reflector 2 and the sub-mirror 3 include almost axially symmetrical reflection curved surfaces with respect to the system optical axis OA, and the pair of electrodes 15, 16 are arranged so that an electrode axis which is the axial center thereof is allowed to approximately correspond to the system optical axis OA.

The discharge lamp 1 supports the first and second electrodes 15, 16 fixed at the tips of the metal foils 17a, 17b in, for example, a quartz glass tube and is fabricated by shrink sealing in which the quarts glass tube is heated from the periphery by a burner at positions corresponding to both sealed portions 13, 14 to be softened and shrunk. The discharge lamp 1 is fixed by injecting and filling an inorganic adhesive C to be hardened in a state in which the first sealed portion 13 is inserted into the neck portion 2a of the reflector 2. The submirror 3 is fixed by injecting and filling the organic adhesive C to be hardened in a state in which the supporting portion 3b is inserted in the second sealed portion 14 of the discharge lamp 1.

Figure 2:
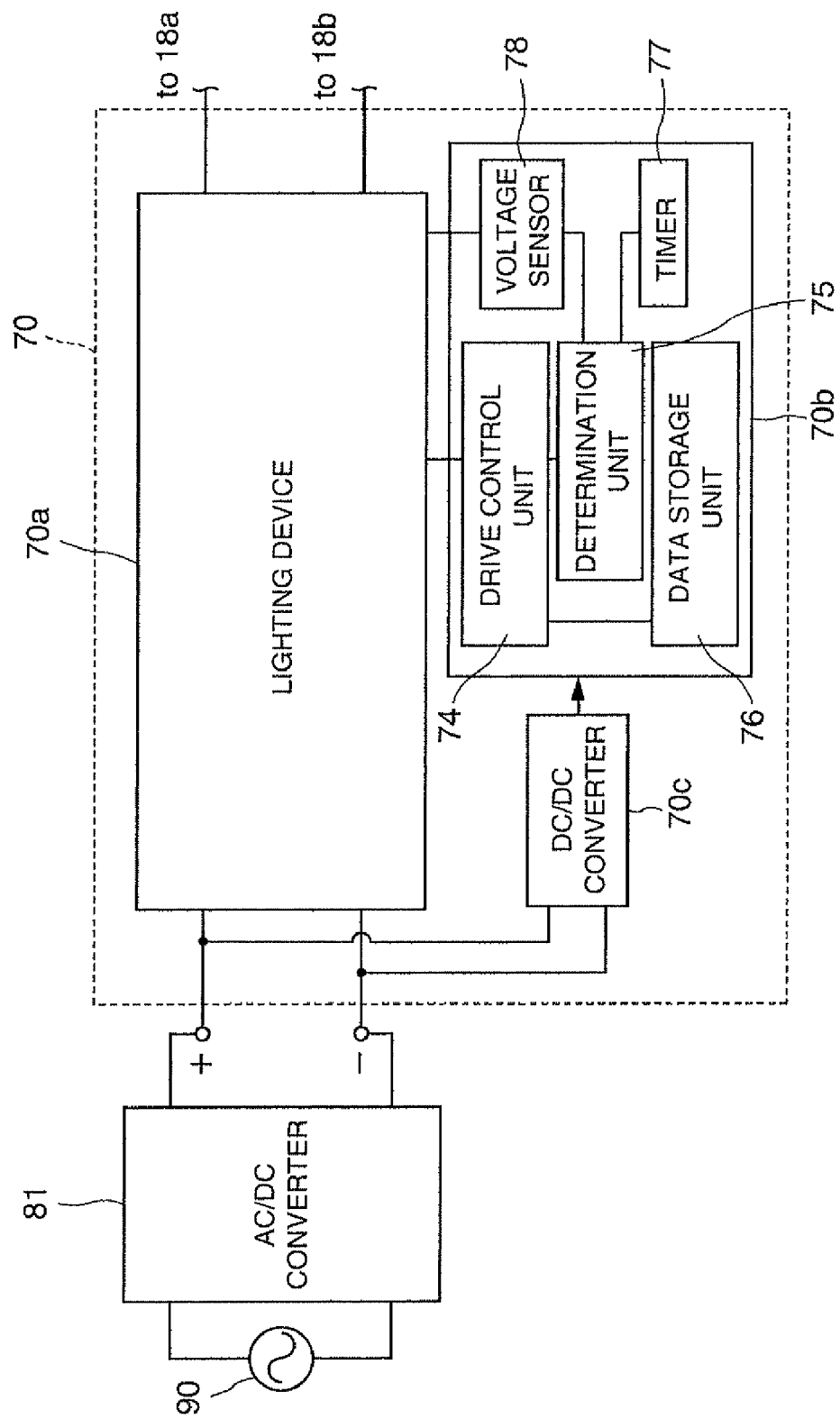
FIG. 2 is a block diagram showing a configuration of a light source driver incorporated in the light source.

FIG. 2 is a block diagram schematically showing a configuration of the light source driver 70 for allowing the light source unit 10 shown in FIG. 1 to perform lighting operation in a desired state.

The light source driver 70 generates alternating current for performing discharge between the pair of electrodes 15, 16 shown in FIG. 1 and the like as well as controls a supplying state of alternating current with respect to both electrodes 15, 16. The light source driver 70 includes a lighting device 70a, a control device 70b and a DC/DC converter 70c. Here, a case in which the light source driver 70 uses an external power source as an example. Specifically, the light source driver 70 is connected to an AC/DC converter 81 and the AC/DC converter 81 is connected to a commercial power source 90. The AC/DC converter 81 converts alternating current supplied from the commercial power source 90 into direct current.

The lighting device 70a is a circuit portion which drives the light source unit 10 of FIG. 1 to be lighted. According to the lighting device 70a, a frequency, amplitude, duty ratio, positive and negative voltages or current ratio, a waveform and the like in the output of the light source driver 70 are adjusted, as a result, arbitrary waveforms such as a rectangular wave, a triangular wave and a superimposed wave thereof and the like are outputted.

The control device 70b is a circuit unit including, for example, a microcomputer, a memory, a sensor, an interface and the like, which is driven by an appropriate drive voltage generated in the DC/DC converter 70c as a power source. The control device 70b includes a drive control unit 74 controlling operation states of the lighting device 70a, a determination unit 75 determining states of the discharge lamp 1 and a data storage unit 76 storing operation examples of the lighting device 70a, namely, various information such as power feeding conditions. The control device 70b also includes a timer 77 for measuring accumulated lighting time of the discharge lamp 1 and a voltage sensor 78 detecting voltage to the discharge lamp 1.

The drive control unit 74 is a unit operating in accordance with programs stored in the data storage unit 76 and the like, selecting a condition which matches the actual status of the discharge lamp 1 from a large number of power feeding conditions stored in the data storage unit 76 to allow the lighting device 70a to perform corresponding initial operations and steady operation. The drive control unit 74 functions as a drive unit for allowing the discharge lamp 1 to perform necessary lighting operation by feeding power to the discharge lamp 1, cooperating with the lighting device 70a.

The determination unit 75 is a unit determining at which level accumulated lighting time of the discharge lamp 1 is or at which level the voltage to the discharge lamp 1 is. Specifically, to which divided time range (state division) the accumulated lighting time of the discharge lamp 1 corresponds or to which divided voltage range (state division) the voltage to the discharge lamp 1 corresponds (at which stage the deterioration of the discharge lamp 1 is) is determined.

The data storage unit 76 stores plural initial power feeding conditions as examples of initial operations of the discharge lamp 1 and plural steady power feeding conditions as examples of the steady operation of the discharge lamp 1. Specifically, the data storage unit 76 stores electric current setting values at the time of a starting operation or at the time of a rising operation included in the initial operations as well as stores frequencies or triangular wave drive-up rates of superimposed waves at the time of steady operation. Here, the triangular wave drive-up rate means relative increase rate of electric power supplied in a latter half period of a half cycle of alternating-current power respectively supplied to the first and second electrodes 15, 16.

The timer 77 checks lighting time of the discharge lamp 1, storing accumulated lighting time in which every lighting time is accumulated. The voltage sensor 78 detects/holds voltage applied between the first and second electrodes 15, 16 of the discharge lamp 1 through the lighting device 70a.

Figure 3:
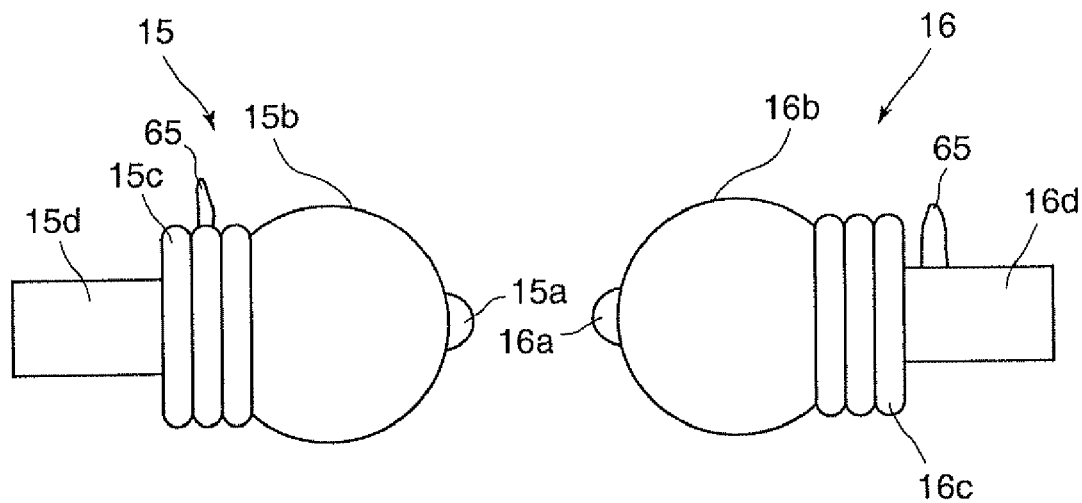
FIG. 3 is an enlarged view explaining the periphery of tips of a pair of electrodes.

FIG. 3 is an enlarged view of tip portions of the first and second electrodes 15, 16 sealed in the discharge lamp 1. The first and second electrodes 15, 16 includes tip portions 15a, 16a, body portions 15b, 16b, coil portions 15c, 16c and axles 15d, 16d. The heat capacity can be increased by providing clumpy body portions 15b, 16b at the tip sides of the first and second electrodes 15, 16, Portions of tips of the first and second electrodes 15, 16 are formed by winding tungsten on the axles 15d, 16d, then, heating/melting the tungsten before sealing. At this time, the remaining portions of the wound tungsten which has not been melted will be coil portions 15c, 16c.

As the accumulated lighting time of the discharge lamp 1 is increased, needle crystals 65 are formed at the coil portion 15c or the axle 16d of the first and second electrodes 15, 16 as shown in the drawing. The needle crystal 65 is formed with a lapse of lighting time of the discharge lamp 1 and tends to extend long gradually. When such needle crystal 65 is once formed, discharge is liable to occur from the needle crystal 65 to an inner wall of the body portion 11. When such discharge is increased, the inner wall of the body portion 11 is deteriorated, which conceivably shorten the life of the discharge lamp 1. Accordingly, in the embodiment, the electric current setting value at the time of the starting operation in initial operations of the discharge lamp 1 is allowed to be decreased gradually in accordance with the increase of the accumulated lighting time by the operation of the light source driver 70. According to this, the discharge from the needle crystal 65 to the inner wall of the body portion 11 can be suppressed, which prevents the life of the discharge lamp 1 from being shortened.

Figure 4A:
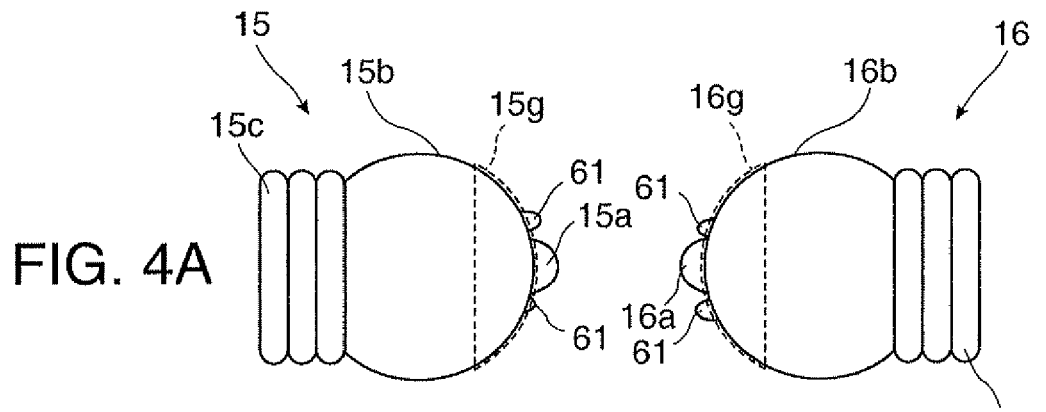
FIG. 4A to FIG. 4C are enlarged views explaining repair of electrodes by a light source driver.
Figure 4B:
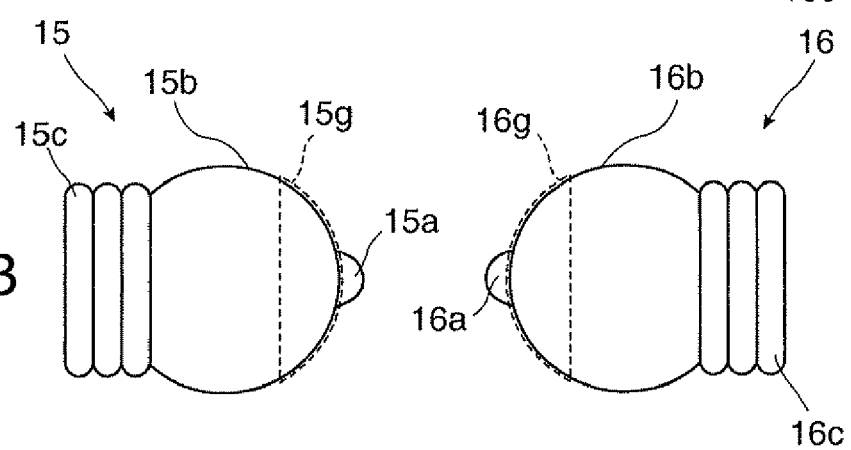
Figure 4C:
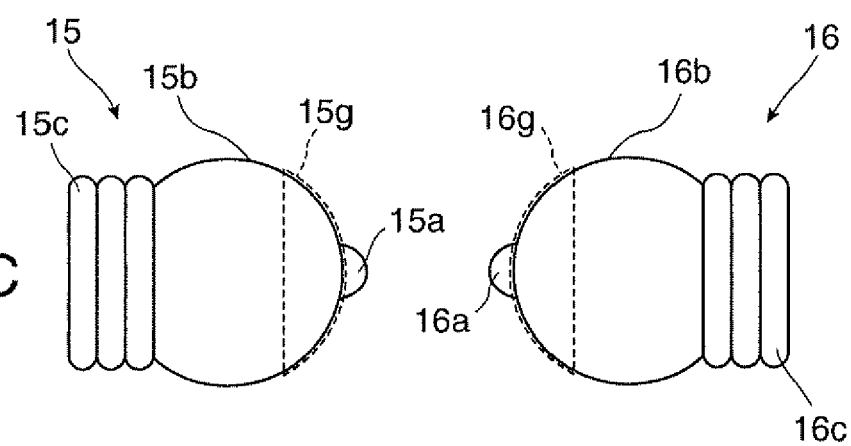

FIG. 4A to FIG. 4C are enlarged views explaining repair of the first and second electrodes 15, 16 by the light source driver 70. As the accumulated lighting time of the discharge lamp 1 is increased, as shown in FIG. 4A, at tip side regions 15g, 16g in the vicinity of the tip portions 15a, 16a of the first and second electrodes 15, 16, plural projections and depressions 61 are irregularly generated. In this case, a phenomenon that a discharge source moves between the tip portion 15a and projections and depressions 61, namely, flicker or an arc jump occurs. The flicker means that the movement of the discharge source continuously occurs and the arc jump means that the discharge source completely moves from the original discharge source position. The flicker causes blinks and the arc jump causes illuminance reduction. Such projections and depressions 61 are melted and smoothed by increasing an electric current value at the end of the rising operation in initial operations of the discharge lamp 1 as shown in FIG. 4B. Specifically, the temperature increases to some degree until reaching the end of the rising operation, and the temperature further increases by the increase of electric current at the end, as a result, projections and depressions 61 are smoothed, leaving the tip portions 15a, 16a. After that, as shown in FIG. 4C, the tip portions 15a, 16a can be grown more largely by the steady operation of the discharge lamp 1, However, when the accumulated lighting time becomes longer with the progress of deterioration of the first and second electrodes 15, 16, it becomes gradually difficult that the projection and depressions 61 formed at the tip portions 15a, 16a are melted, though the both electrodes 15, 16 are consumed and the smoothing of the projections and depressions 61 becomes necessary. Accordingly, in the embodiment, the electric current value at the end of the rising operation in initial operations of the discharge lamp 1 is allowed to be increased gradually with, for example, the increase of the accumulated lighting time by the operation of the light source driver 70. According to this, the projections and depressions 61 can be positively melted even when it becomes difficult that the projections and depressions 61 are melted with the lapse of lighting time of the discharge lamp 1. This can prevent the interruption of growth of the tip portions 15a, 16a.

Figure 5A:
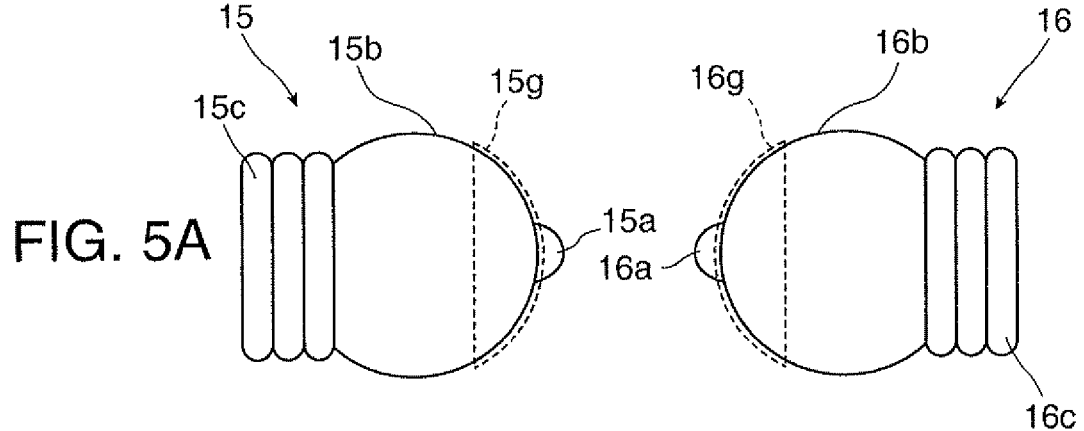
FIG. 5A and FIG. 5B are enlarged views explaining repair of electrodes by the light source driver.
Figure 5B:
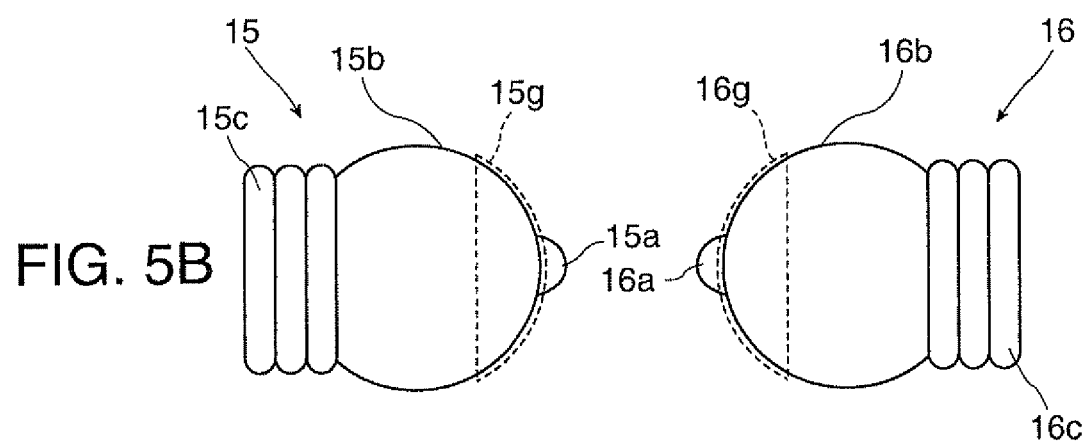

FIG. 5A and FIG. 5B are enlarged views explaining the growth in the first and second electrodes 15, 16 by the light source driver 70. FIG. 5A shows the tip portions 15a, 16a which have been partially melted, deformed and shortened at the time of the rising operation in the initial operations as described above. As the accumulated lighting time of the first and second electrodes 15, 16 becomes longer, it becomes gradually difficult that the tip portions 15a, 16a are grown. In the present embodiment, in the steady operation of the discharge lamp 1, the triangular wave drive-up rate which corresponds to relative increase amount of electric current supplied in a latter half period of a half cycle of alternating current respectively supplied to the first and second electrodes 15, 16 is allowed to be increased by the operation of the light source driver 70. Accordingly, the growth of the tip portions 15a, 16a at the steady operation can be promoted and the desired shape of the tip portions 15a, 16a as shown in FIG. 5B can be maintained.

Figure 6:
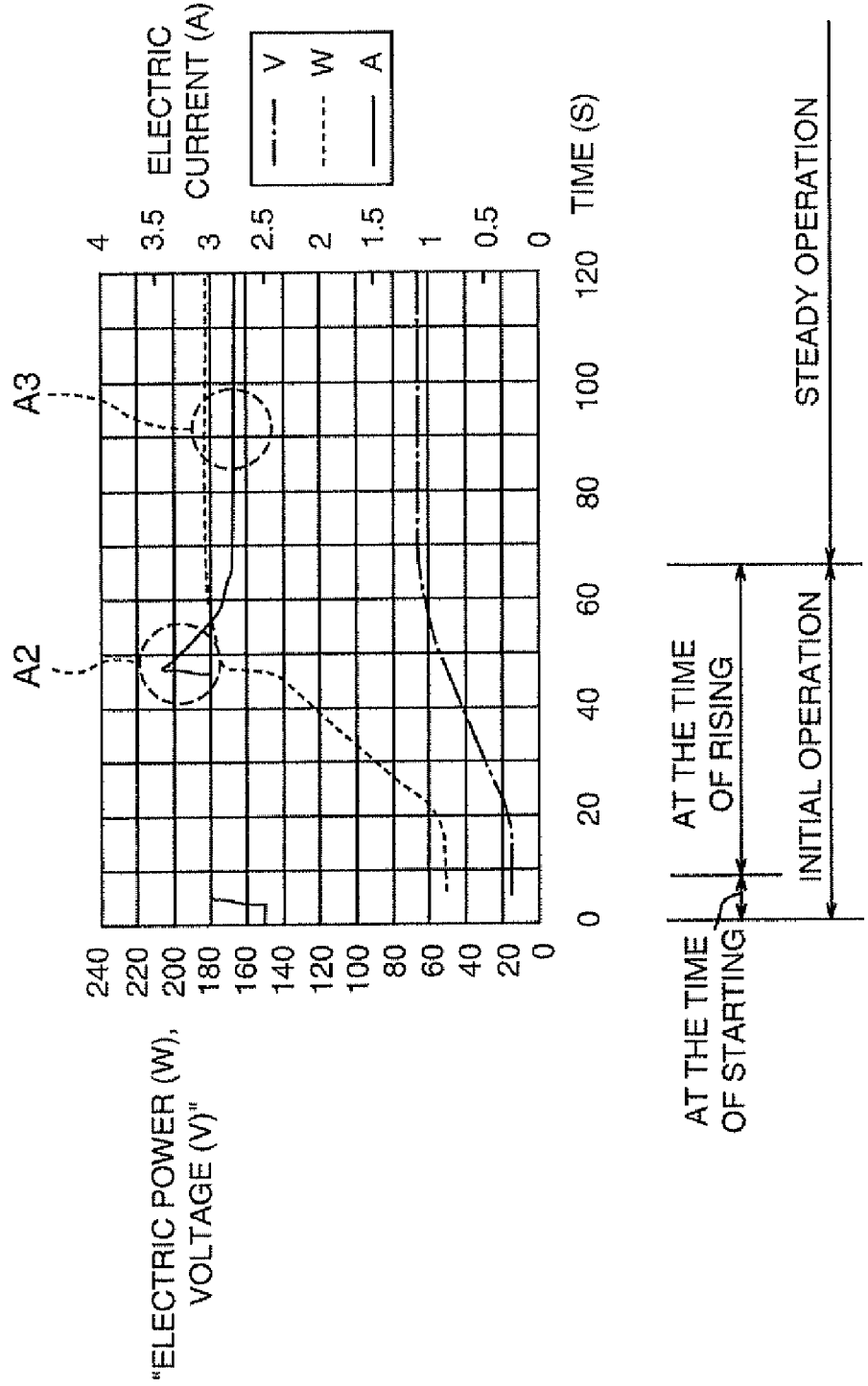
FIG. 6 is a graph conceptually explaining an example of a current-carrying states of an discharge lamp.

Hereinafter, specific operations of the light source driver 70 will be explained. FIG. 6 is a graph conceptually explaining an example of a current-carrying state of the discharge lamp 1 from initial operations to the steady operation. In the graph, the horizontal axis shows lapsed time from the start of lighting and the vertical axis shows voltage (long-and-short dashed line), electric power (dashed line) and electric current (solid line) supplied to the discharge lamp 1. In the example, an initial operation period for approximately 60 seconds is provided, then, a steady operation period corresponding to the rated operation is provided. The initial operation period is a period for supplying transitional energy (specifically, transitional electric power) to the discharge lamp 1, and the steady operation period is a period for supplying steady energy (specifically, steady electric power) to the discharge lamp 1. In this case, in the initial operation period, starting operation time for approximately several seconds and rising operation time for approximately 60 seconds after that are provided. The voltage gradually increases during the initial operation period and is saturated to a fixed value during the steady operation period. The electric power gradually increases at the rising time during the initial operation period and is saturated to a fixed value during the steady operation period. Further, the electric current is controlled to maintain a predetermined value during the initial operation period after dielectric breakdown, increasing at the end of the rising operation time, then, controlled to be a predetermined value during the steady operation period after that, maintaining approximately a fixed value.

Figure 7A:
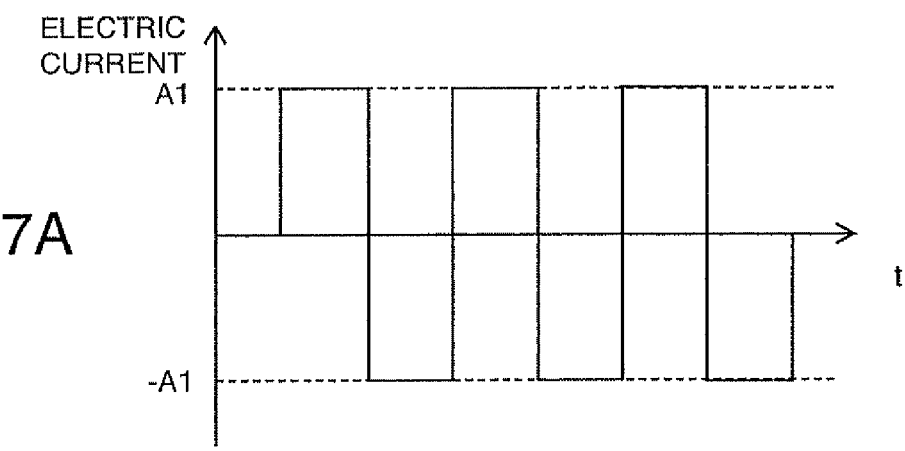
FIG. 7A to FIG. 7C are graphs explaining examples of driving at the time of a starting operation.
Figure 7B:
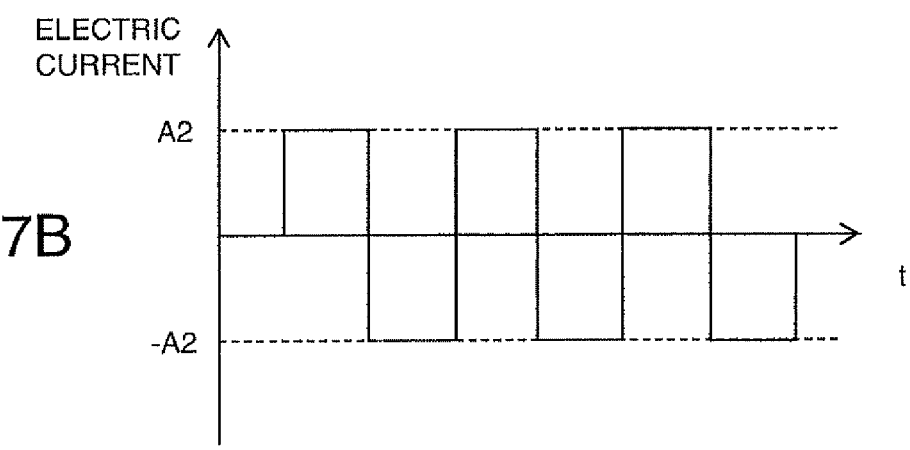
Figure 7C:
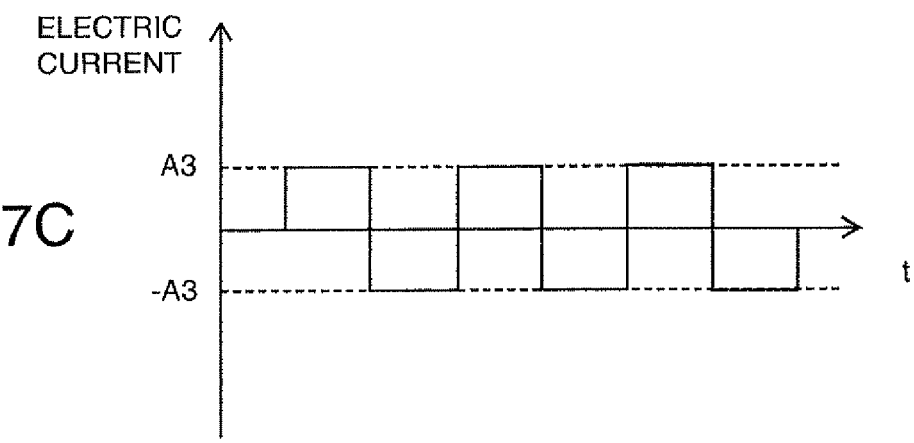

FIG. 7A to FIG. 7C are graphs conceptually explaining examples of driving at the time of the starting operation, namely, at the region A1 of FIG. 6. In respective graphs, the horizontal axis shows time and the vertical axis shows electric current. FIG. 7R is a graph explaining the supply of alternating current to the discharge lamp 1 the accumulated lighting time of which is short, namely, the new discharge lamp 1 at the time of the starting operation. In this case, rectangular-wave alternating current having an electric current value A1 is supplied to the discharge lamp 1. FIG. 7B is a graph explaining the supply of alternating current to the discharge lamp 1 the accumulated lighting time of which is intermediate, namely, the discharge lamp 1 which has been used for a certain period at the time of the starting operation. In this case, rectangular-wave alternating current having an electric current value A2 which is smaller than the electric current value A1 is supplied to the discharge lamp 1. FIG. 7C is a graph explaining the supply of alternating current to the discharge lamp 1 the accumulated lighting time of which is long, namely, the old discharge lamp 1 at the time of the starting operation. In this case, rectangular-wave alternating current having an electric current value A3 which is smaller than the electric current value A2 is supplied to the discharge lamp 1. That is to say, as the accumulated lighting time of the discharge lamp 1 increases, the electric value of the discharge lamp 1 is decreased. Accordingly, it is possible to prevent strong discharge from occurring from the needle crystals 65 which are grown at the first and second electrodes 15, 16 as well as suppress the phenomenon that the life of the discharge lamp 1 is shortened.

The driving waveform at the time of the starting operation of lighting allows normal discharge to occur from the first and second electrodes 15, 16 as well as prevents arc discharge to the body portion 11 due to the discharge being maintained for a long time at a certain point. At an early stage of starting discharge just after the dielectric breakdown, discharge occurs also from the coil portions 15c, 16c, and the whole electrodes 15, 16 are heated meanwhile. Then, when the protruding tip portions 15a, 16a reach sufficiently high temperature, the discharge position moves from the coil portions 15c, 16c to the tip portions 15a, 16a. Abnormal phenomena such as discharge to the body portion 11 are liable to occur at the time of discharging from the coil portions 15c, 16c or the needle crystals 65, therefore, it is preferable that the discharge position is moved to the tip portions 15a, 16a immediately by heating of the both electrodes 15, 16 at the time of the starting operation. For that purpose, inversion of polarity is performed before the discharge position is heated too much, which avoids arc discharge to the body portion 11. As described above, the needle crystals 65 tends to grow with the increase of the accumulated lighting time, therefore, in order to prevent early deterioration of the discharge lamp 1 caused by the growth, the electric current value at the time of the starting operation of the discharge lamp 1 is decreased.

Figure 8A:
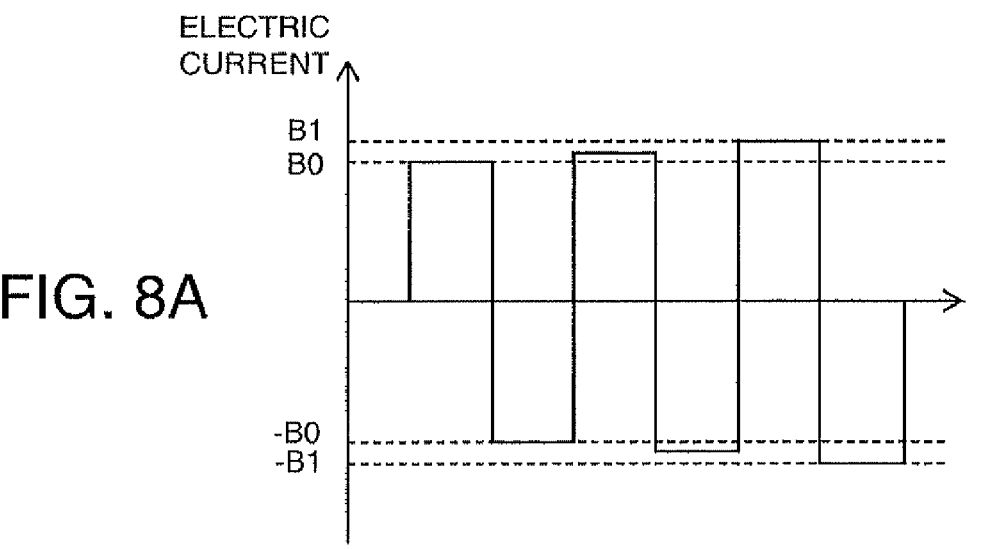
FIG. 8A to FIG. 8C are graphs explaining examples of driving at the time of a rising operation.
Figure 8B:
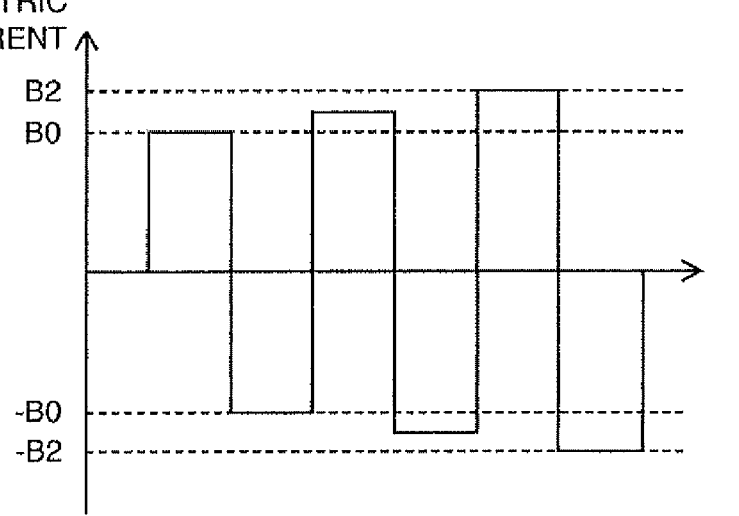
Figure 8C:
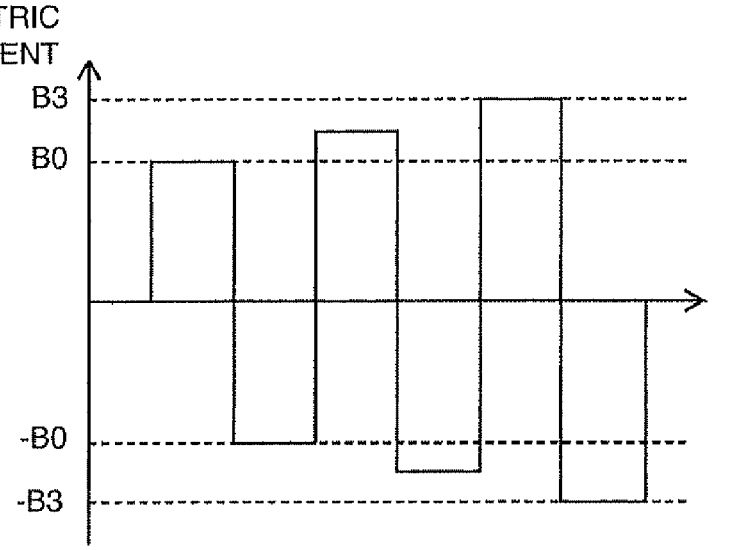

FIG. 8A to FIG. 8C are graphs conceptually explaining examples of driving at the end of the rising operation, namely, at the region A2 of FIG. 6. In respective graphs, the horizontal axis shows time and the vertical axis shows electric current. FIG. 8A is a graph explaining the supply of alternating current to the discharge lamp 1 the accumulated lighting time of which is short, namely, the new discharge lamp 1 at the end of the rising operation. In this case, rectangular-wave alternating current is supplied to the discharge lamp 1, and the electric current value thereof increases to B1. FIG. 8B is a graph explaining the supply of alternating current to the discharge lamp 1 the accumulated lighting time of which is intermediate, namely, the discharge lamp 1 which has been used for a certain period at the end of the rising operation. In this case, the rectangular-wave alternating current is supplied to the discharge lamp 1, and the electric current value thereof increases to B2 which is larger than B1. FIG. 8C is a graph explaining the supply of alternating current to the discharge lamp 1 the accumulated lighting time of which is long, namely, the old discharge lamp 1 at the end of the rising operation. In this case, rectangular-wave alternating current is supplied to the discharge lamp 1, and the electric current value thereof increases to B3 which is larger than B2. That is to say, as the accumulated lighting time of the discharge lamp 1 increases, the increasing amount of alternating current at the end of the rising operation is increased. Accordingly, even when the accumulated lighting time of the discharge lamp 1 increases and deterioration of the first and second electrodes 15, 16 proceeds, the melting amount of the projections and depression 61 in the tip side regions 15g, 16g can be secured, which can prevent the interruption of growth of the tip portions 15a, 16a.

The driving waveform at the start of the rising allows the discharge lamp 1 to reach a steady state in a short time without giving excessive damage to the first and second electrodes 15, 16. Here, the damage of electrodes means that the both electrodes 15, 16 are heated by excessive electric current and the tip portions 15a, 16a are melted and smoothed, Accordingly, it is a problem in a point that the arc length becomes long and the illuminance reduction is caused in a subject of illumination such as a projector. However, when the melting phenomenon is conversely utilized to a moderate degree, it is possible to melt projections and depressions 61 in the vicinity of the consumed tip portions 15a, 16a once, and to melt the tip portions 15a, 16a moderately, therefore, the tip portions 15a, 16a can be grown gradually at the next steady operation. The light emission luminance increases by increasing a current-carrying amount of the discharge lamp 1, therefore, in the case that the subject of illumination is a projector, illuminance of images may be temporarily changed to adversely affect quality when the repair is performed in the steady operation. However, in the rising stage before reaching the rated value as in the embodiment, since the illuminance continuously increases, it is not necessary to consider the temporary change of illuminance. That is, even when the change of illuminance occurs due to the change of the current amount or change of shapes of the tip portions 15a, 16a, by increasing the current-carrying amount of the discharge lamp 1 and melting the projections and depressions 61 in the vicinity of the tip portions 15a, 16a, image quality will not receive a fatal bad influence.

Concerning such repair, it was experimentally confirmed that the tip portions 15a, 16a are difficult to be melted when the first electrode 15 and the second electrode 16 are consumed. As the cause thereof, the following circumstances can be considered: (1) since the distance between the tip portions 15a, 16a and the body portion 11 is short, heat release from the tip portions 15a, 16a to the body portion 11 is promoted, as a result, it becomes difficult that temperature increases, (2) a crystal of tungsten which is an electrode component becomes coarse during lighting and a melting point increases as compared with the case when the crystal grain size is small, which leads to the difficulty of melting, (3) the purity of tungsten increases because impurities in the first and second electrodes 15, 16 are evaporated and eliminated during lighting, and a melting point increases accordingly, which leads to the difficulty of melting. Accordingly, even when the first electrode 15 and the second electrode 16 are consumed, it is necessary that the melting phenomenon is positively induced by allowing electric current which is larger than the one in the period when accumulated lighting time is short to flow in the discharge lamp 1 in order to achieve re-creation of protrusions by the melting as describe above. According to the above concept, as the accumulated lighting time of the discharge lamp 1 increases, the increasing amount of alternating current at the end of the rising operation is increased.

Figure 9A:
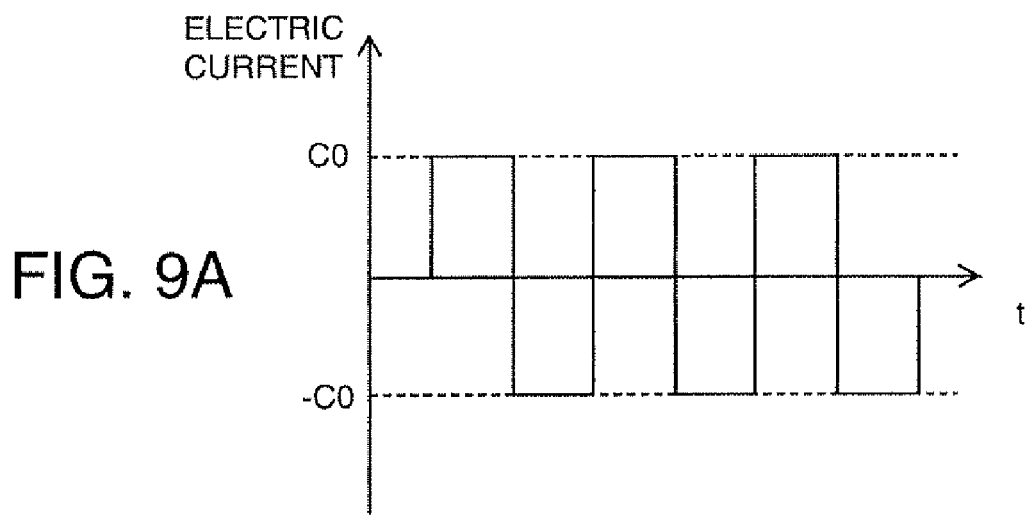
FIG. 9A to FIG. 9C are graphs explaining examples of driving at the time of a steady operation.
Figure 9B:
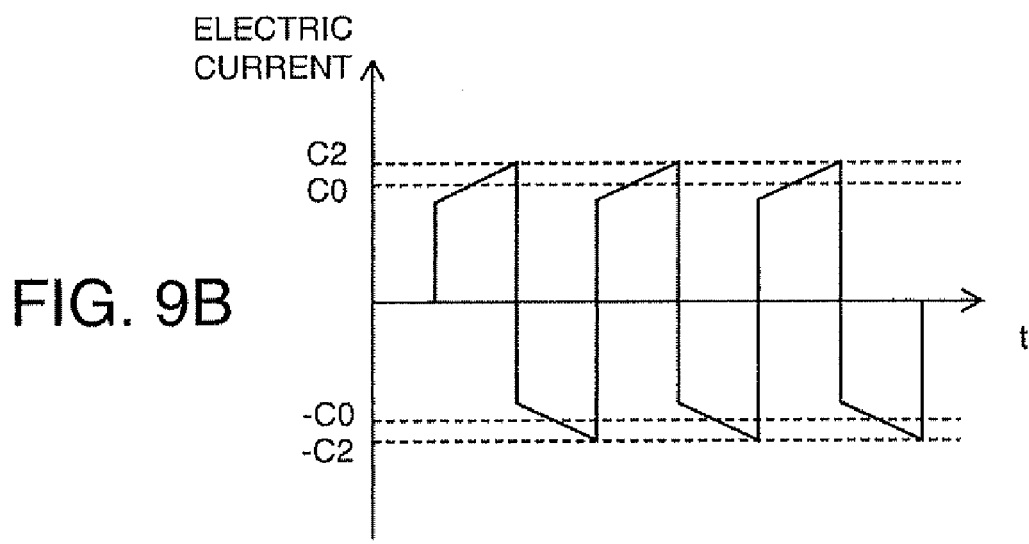
Figure 9C:
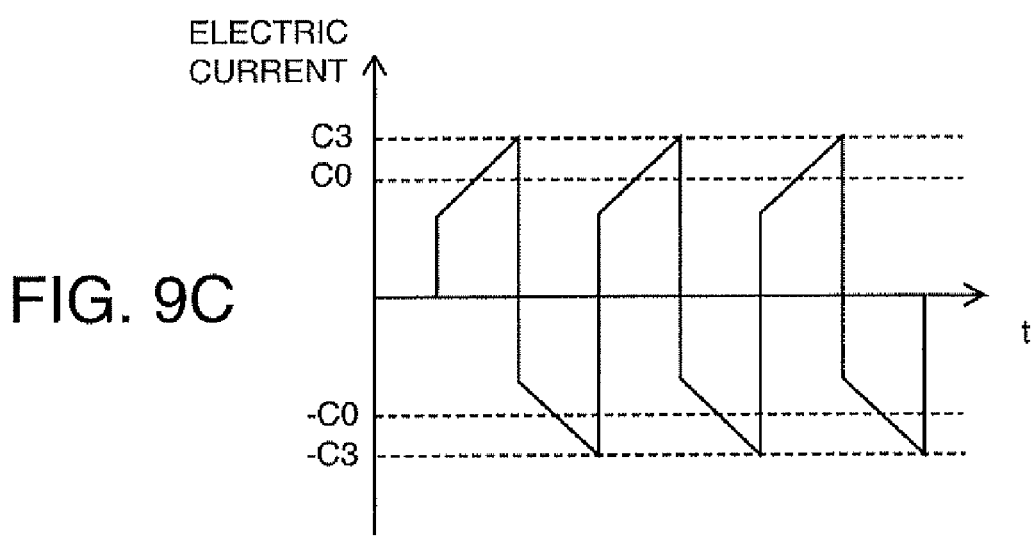

FIG. 9A to FIG. 9C explain operations after reaching the rated value, which are graphs conceptually explaining examples of driving in the steady operation period, namely, in the region A3 of FIG. 6. In respective graphs, the horizontal axis shows time and the vertical axis shows electric current. FIG. 9A is a graph explaining the supply of alternating current to the discharge lamp 1 the accumulated lighting time of which is short, namely, the new discharge lamp 1 at the steady operation period. In this case, rectangular-wave alternating current is supplied to the discharge lamp 1, and the electric current value thereof is C0. FIG. 9B is a graph explaining the supply of alternating current to the discharge lamp 1 the accumulated lighting time of which is intermediate, namely, the discharge lamp 1 which has been used for a certain period at the steady operation period. In this case, a super imposed wave in which a triangular wave is superimposed on a rectangular wave is supplied to the discharge lamp 1, and an average current value thereof is maintained at C0, however, a peak value of the superimposed wave is C2. Here, when the ratio of the peak value C2 with respect to the average current value C0 is a triangular wave drive-up rate of the superimposed wave, the triangular wave drive-up rate C2/C0 increases as compared with a triangular wave drive-up rate 1 of FIG. 9A. When the triangular wave drive-up rate C2/C0 is larger than 1 as in this case, electric power supplied in a latter half period of a half cycle corresponding to a positive electrode in alternating-current power supplied respectively to the first electrode 15 and the second electrode 16 of the discharge lamp 1 when the accumulated lighting time is intermediate is increased relatively with respect to electric power supplied in the latter half period of the half cycle in alternating-current power supplied respectively to the first electrode 15 and the second electrode 16 of the discharge lamp 1 when the accumulated lighting time is short. Such relative increasing amount can be evaluated as the triangular wave drive-up rate C2/C0. FIG. 9C is a graph explaining the supply of alternating current to the discharge lamp 1 the accumulated lighting time of which is long, namely, the discharge lamp 1 which has been used for a certain period in the steady operation period. In this case, a superimposed wave is supplied to the discharge lamp 1, and an average electric current value is maintained at C0, however, a peak value of the superimposed wave is C3. Here, a triangular wave drive-up rate C3/C0 of the superimposed wave increases as compared with the triangular wave drive-up rate C2/C0 of FIG. 9B. Accordingly, even when the accumulated lighting time of the discharge lamp 1 increases and deterioration of the first electrode 15 and the second electrode 16 proceeds, the size of the tip portions 15a, 16a can be maintained.

The driving waveform at the time of the steady operation realizes a desired triangular wave drive-up rate by superimposing a triangular wave on a rectangular wave. This is for promote the growth or maintenance of the tip portions 15a, 16a by increasing the electric power value at the latter half region in the half cycle of alternating drive. The effect of increasing the electric power value in the latter half region at the half cycle of alternating drive was experimentally confirmed. It was also experimentally confirmed that protrusions are difficult to be grown when the lighting time becomes long and the first electrode 15 and the second electrode 16 are consumed. Accordingly, as the accumulated lighting time of the discharge lamp 1 increases, namely, as the consumed state proceeds, electric power is allowed to be increased in the latter half region of the half cycle of alternating drive to thereby maintain the growth of the tip portions 15a, 16a.

Figure 10:
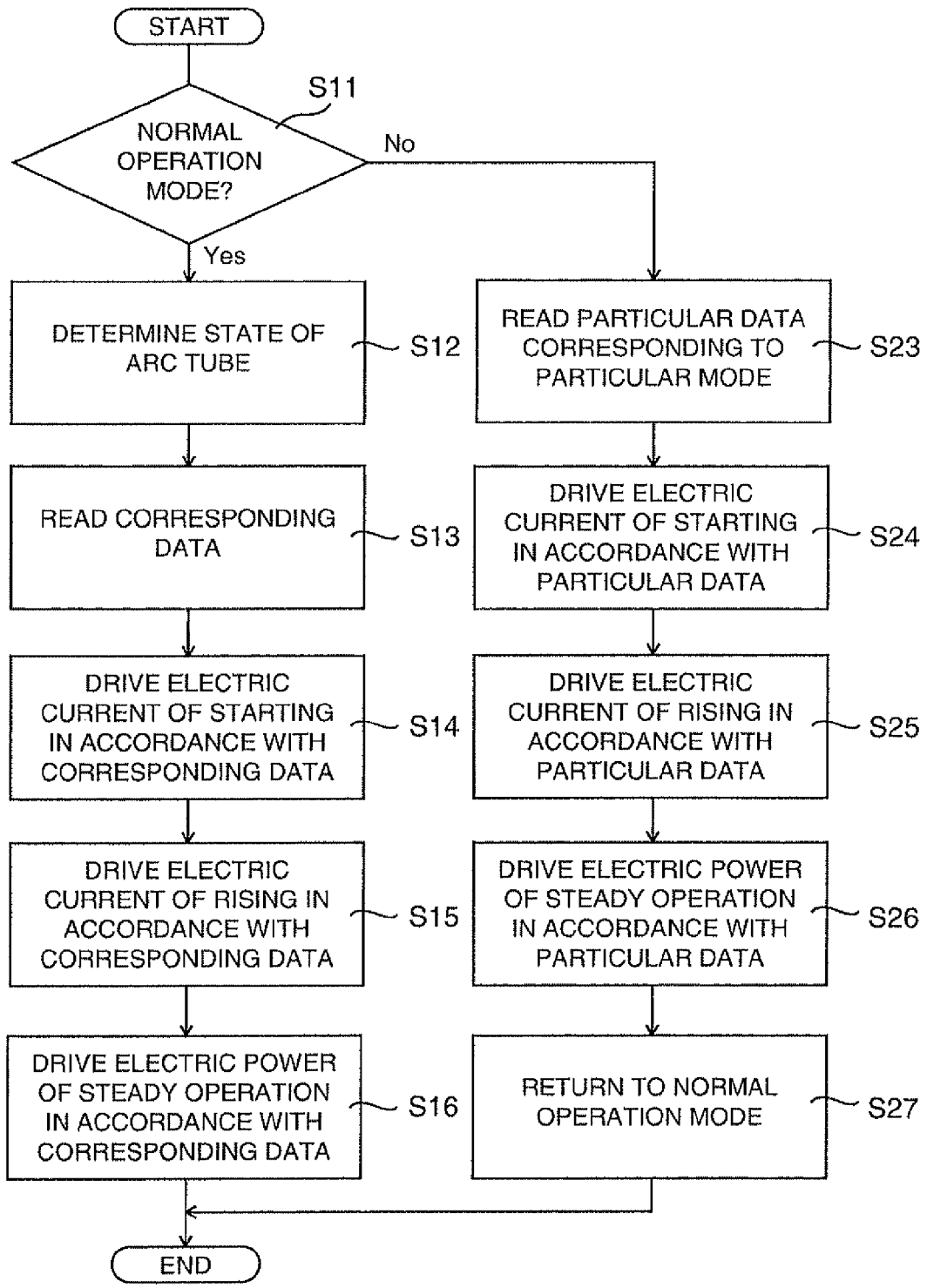

FIG. 10 is a flowchart explaining operations of the light source driver 70. Before starting lighting after the power is applied, the control device 70b checks whether the driver is set to a normal operation mode or not by reading setting information of the data storage unit 76 (Step S11). When the driver is set to the normal operation mode, the control device 70b determines the state of the discharge lamp 1 (stage of deterioration of the discharge lamp 1) by checking the accumulated lighting time measured by the timer 77 (Step S12). Specifically, the deterioration state of the discharge lamp 1 is divided into five stages in accordance with the accumulated lighting time. The first stage is in a range of 0 to 100 hours, the second stage is in a range of 101 to 300 hours, the third stage is in a range of 301 to 1000 hours, the fourth stage is in a range of 1001 to 3000 hours, and the fifth stage is 3001 hours or more. Note that the above state division is one example and the setting can be appropriately changed according to types or applications of the discharge lamp 1. The determination results of such state division are stored in a specific area of the data storage unit 76 as a state division information.

Next, the control unit 70b reads an operation condition corresponding to state division information determined in Step S12, that is, data corresponding to the deterioration stage of the discharge lamp 1 from a drive control table stored in the data storage unit 76 (Step S13). Plural groups of corresponding data corresponding to respective state divisions include plural initial power feeding conditions and plural steady power feeding conditions, in which the former initial power feeding conditions further include starting-time power feeding conditions and rising-time power feeding conditions. A table 1 below shows an example of a drive control table.

TABLE 1

| Determination Result | | Operation Conditions (Drive Control) | | |
| --- | --- | --- | --- | --- |
| State Division | Time | Start | Rising | Steady |
| First state | 0-100 | 2.5 A | 3.6 A | 0% |
| Second state | 101-300 | 2.5 A | 3.7 A | 10% |
| Third state | 301-1000 | 2.5 A | 3.7 A | 15% |
| Fourth state | 1001-3000 | 2.2 A | 3.8 A | 20% |
| Fifth state | 3001- | 2.0 A | 3.8 A | 30% |

In the case of the drive control table, the electric current value supplied to the discharge lamp 1 is gradually decreased from 2.5 A to 2.0 A so as to correspond to the progress of deterioration of the first to fifth stages of the discharge lamp 1 as starting-time power feeding conditions in the initial power feeding conditions at the time of the starting operation. Also, at the end of the rising operation, the electric current value supplied to the discharge lamp 1 is gradually increased from 3.6 A to 3.8 A so as to correspond to the progress of deterioration of the first to fifth stages of the discharge lamp 1 as rising-time power feeding conditions in the initial power feeding conditions. Further, the triangular wave drive-up rate supplied to the discharge lamp 1 is gradually increased from 0% to 30% so as to correspond to the progress of deterioration of the first to fifth stages of the discharge lamp 1 as steady power feeding conditions in the steady operation period. For example, when the discharge lamp 1 is determined to be in the first state, operation conditions, namely, corresponding data is read, in which the electric current value at the time of the starting operation is set to 2.5 A, the electric current value at the end of the rising operation is set to 3.6 A and the triangular wave drive-up rate of supplying current during the steady operation period is set to 0%.

Next, the control device 70b controls the operation state of the lighting device 70a, namely, driving of the discharge lamp 1 based on corresponding data concerning the starting operation time read in Step S13 (Step S14). Specifically, in the case that the state division is in the first stage in which the deterioration stage of the discharge lamp 1 is the lowest, alternating current of 2.5 A is supplied to the discharge lamp 1 as an operation at the time of the starting operation to generate normal discharge between the first and second electrodes 15, 16. At this time, the frequency of alternating current is several ten to several hundred Hz and the starting time operation is continued for 2 or 3 seconds. The frequency or duration time of alternating current at the time of the starting operation can be fixed or the setting of which can be changed in accordance with the change of the state division by being included in the operation conditions of Table 1.

Next, the control device 70b controls the operation state of the lighting device 70a, namely, driving of the discharge lamp 1 based on corresponding data concerning the rising operation time read in Step S13 (Step S15). Specifically, for example, in the case that the state division is in the first stage in which the deterioration stage of the discharge lamp 1 is the lowest, alternating current of approximately 3.0 A is supplied to the discharge lamp 1 as an initial operation of rising to allow light emission between the first and second electrodes 15, 16 to reach the steady state in a short time. At this time, the frequency of alternating current is 50 to 300 Hz, and the rising-time operation is continued until reaching the rated power. The frequency of alternating current at the time of the starting operation can be fixed or the setting of which can be changed in accordance with the change of the state division by being included in the operation conditions of Table 1. Further, as an operation at the end of the rising operation, alternating current of approximately 3.6 A is supplied to the discharge lamp 1 to melt the projections and depressions 61 formed at the first and second electrodes 15, 16 to thereby promote the growth of the tip portions 15a, 16a. As an increasing and decreasing pattern of the electric current value at the end of the rising operation, for example, the electric current value is increased for approximately one second at a fixed gradient, then, the electric current value is gradually decreased after reaching the maximum value. The increasing and decreasing pattern of the electric current value can be fixed or the setting of which can be changed in accordance with the change of the state division by being included in the operation conditions of Table 1.

Next, the control device 70b controls the operation state of the lighting device 70a, namely, driving of the discharge lamp 1 based on corresponding data concerning the steady operation period read in Step S13 (Step S16). Specifically, for example, in the case that the state division is in the first stage in which the stage of deterioration of the discharge lamp 1 is the lowest, rectangular-wave alternating current having a triangular wave drive-up rate of 0% is supplied to the discharge lamp 1 as the operation in the steady operation period to generate normal discharge between the first and second electrodes 15, 16. At this timer electric power of, for example, approximately 170 W is supplied between the first and second electrodes 15, 16. Further, in the case that the state division is in the second stage, alternating current of a superimposed wave having a triangular wave drive-up rate of 10% is supplied to the discharge lamp 1 to promote the growth of the tip portions 15a, 16a to some degree. The triangular wave drive-up rate of alternating current is not always fixedly maintained at respective stages but also can be cyclic. Specifically, it is also possible to supply plural types of waveforms having triangular wave drive-up rates which are different according to respective waves between the first and second electrodes 15, 16 alternately. In this case, an average triangular wave drive-up rate is increased according to the stage of deterioration.

On the other hand, when it is determined that the driver is not set to the normal operation mode in step S11, the control device 70b reads operation conditions, namely, particular data from a particular mode table stored in the data storage unit 76 (Step S23). The particular mode table defines serious repair processes of the first and second electrodes 15, 16. For example, at the end of the rising operation, the tip portions 15a, 16a are completely melted and smoothed, then, at the begging of the steady operation period, the tip portions 15a, 16a are gradually grown at smooth end surfaces of the body portions 15b, 16b. Accordingly, setting information such as the increasing amount of the electric current value at the end of the rising operation is stored in the particular data of the particular mode table, in addition, various setting information such as a increasing and decreasing amount of the electric current value, a triangular wave drive-up rate of a superimposed wave, duty ratio, a frequency in the steady operation period is stored.

Next, the control device 70b controls the operation state of the lighting device 70a, namely, start of lighting of the discharge lamp 1 based on corresponding data concerning the starting operation time read in Step S23 (Step S24).

Next, the control device 70b controls the operation state of the lighting device 70a, namely, the lighting state of the discharge lamp 1 based on corresponding data concerning the rising operation time read in Step S23 (Step S25).

Next, the control device 70b controls the operation state of the lighting device 70a, namely, the lighting state of the discharge lamp 1 based on corresponding data concerning the steady operation period read in Step S23 (Step S26).

According to the above, operations in the particular mode are performed, and the repair processes with respect to the first and second electrodes 15, 16 are executed. The operation in the particular mode is periodically performed or temporarily performed according to the determination by the user, which is cancelled by the completion of the repair processes and after that, the mode is returned to the normal operation mode (Step S27). When returned to the normal operation mode, the steady operation corresponding to the step S16 is performed.

In the above example, the drive control table stored in the data storage unit 76 is formed by dividing the deterioration stage of the discharge lamp 1 into five stages of states by taking the accumulated lighting time as a determination reference (refer to Table 1), however, the drive control table can be formed by dividing the deterioration stage of the discharge lamp 1 into five stages of states based on a voltage value at the time of the steady operation of the first and second electrodes 15, 16. Specifically, a detected output by the voltage sensor 78 is stored in the data storage unit 76 before turning off the light at the time of a previous operation, and voltage data stored in the data storage unit 76 is referred before starting the operation at this time to determine the state of the discharge lamp 1 (Step S12). The following table 2 shows an example of the drive control table using the voltage data as a reference.

TABLE 2

| Determination Result | | Operation Conditions (Drive Control) | | |
|---|---|---|---|---|
| State Division | Voltage | Start | Rising | Steady |
| First state | 0-65 V | 2.5 A | 3.6 A | 0% |
| Second state | 66 V-75 V | 2.5 A | 3.7 A | 10% |
| Third state | 76 V-90 V | 2.5 A | 3.7 A | 15% |
| Fourth state | 91 V-100 V | 2.2 A | 3.8 A | 20% |
| Fifth state | 101 V- | 2.0 A | 3.8 A | 30% |

In the case of the drive control table, the first stage in which the deterioration stage of the discharge lamp 1 is the lowest is in a range of 0 to 65V, the second stage is in a range of 66 to 75V, the third stage is in a range of 76 to 90V, the fourth stage is in a range of 91 to 100V, and the fifth stage is 101 V or more. Also in the drive control table, the electric current value supplied to the discharge lamp 1 at the time of the starting operation is gradually decreased so as to correspond to the progress of the first to fifth stages, and the electric current value supplied to the discharge lamp 1 at the end of the rising operation is gradually increased so as to correspond to the progress of deterioration of the first to fifth stages. Further, in the steady operation period, the triangular wave drive-up rate of a superimposed wave supplied to the discharge lamp 1 is gradually increased so as to correspond to the progress of the first to fifth stages.

As can be seen from the above explanation, in the light source 100 according to the embodiment, the control device 70b performs operations according to any of operation conditions selected from plural operation conditions in accordance with the determination result of the state division of the discharge lamp 1, specifically, the control device 70b performs initial operations of starting and rising according to the adjustment of the electric current value supplied to the discharge lamp 1 (Step S14, S15) and performs the steady operation according to the adjustment of the triangular wave drive-up rate of the superimposed wave supplied to the discharge lamp 1 (Step S16) therefore, appropriate operations according to variation of the state division of the discharge lamp 1 can be secured. As a result, the light emission state of the discharge lamp 1 can be maintained in a good state with less flicker or the like over a long period of time, which makes the life of the discharge lamp 1 longer. In the embodiment, in Table 1 and Table 2, power feeding conditions are not always changed at the same time at the time of the starting operation as the initial operation, at the time of the rising operation as the initial operation and at the time of the steady operation in switching of respective stages of the first to fifth stages. This is because respective power feeding conditions are appropriately set with respect to each state of deterioration of the discharge lamp 1 at the time of the starting operation as the initial operation, at the time of the rising operation as the initial operation and at the time of the steady operation.

Figure 11:
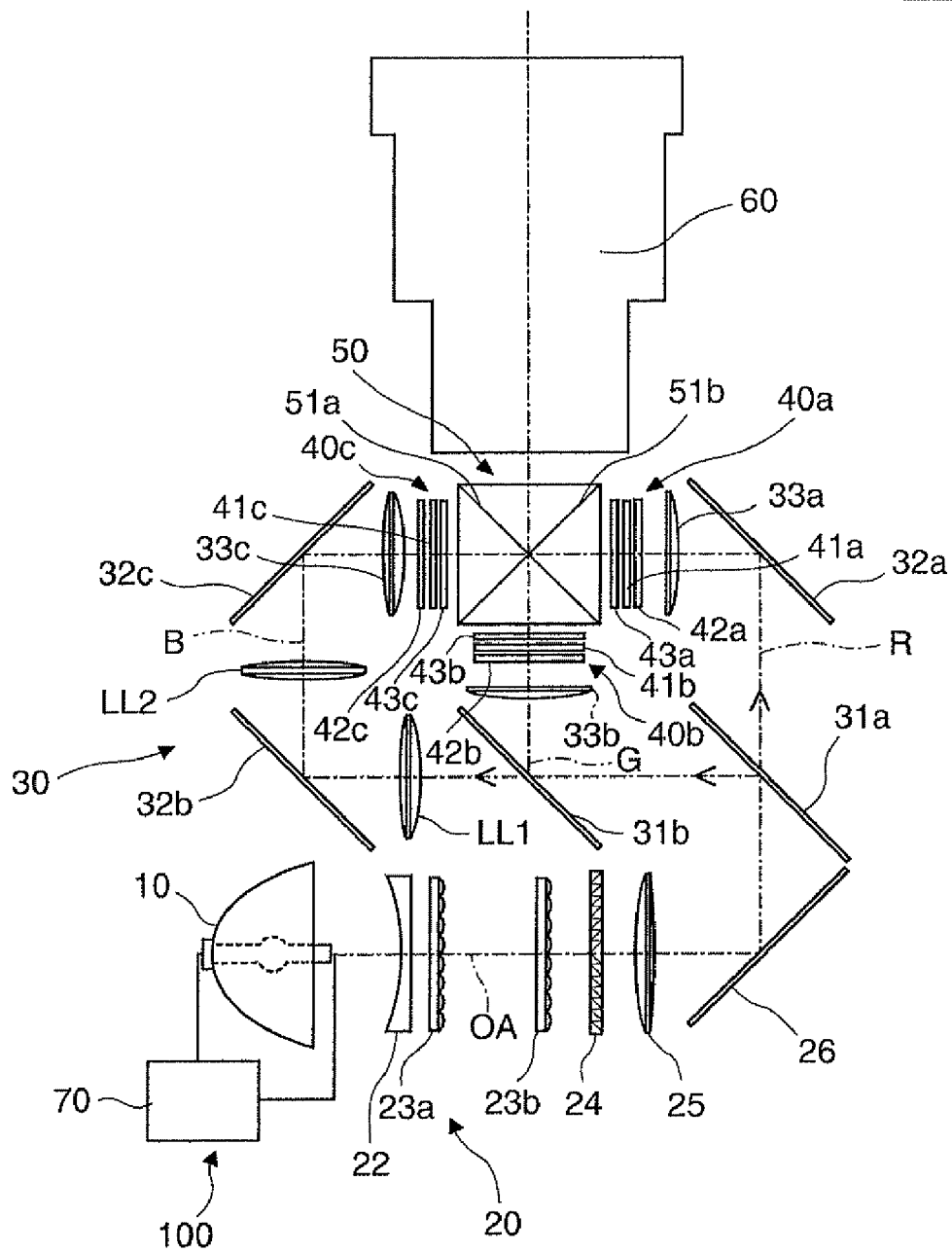
FIG. 11 is a view explaining a projector incorporating the light source.

FIG. 11 is a conceptual view for explaining a structure of a projector incorporating the light source 100 of FIG. 1. A projector 200 includes the light source 100, an illumination system 20, a color separation system 30, liquid crystal light valves 40a, 40b, and 40c, a cross dichroic prism 50 and a projection lens 60. The three liquid crystal light valves 40a, 40b, and 40c form a light modulation system as a whole.

In the projector 200, the light source 100 includes the light source unit 10 and the light source driver 70 shown in FIG. 1, generating illumination light for illuminate the liquid crystal light valves 40a, 40b and 40c through the illumination system 20 and the like.

The illumination system 20 includes a parallelizing lens 22 parallelizing the luminous-flux direction of source light, first and second fly-eye lenses 23a, 23b forming an optical integration system for dividing and superimposing light, a polarization conversion element 24 aligning polarization directions of light, a superimposing lens 25 superimposing light passed through both fly-eye lenses 23a, 23b and a mirror 26 folding an optical path of light, forming approximately white illumination light which is uniformized by the above. In the illumination system 20, the parallelizing lens 22 converts the luminous-flux direction of illumination light exiting from the light source unit 10 to an approximately parallel direction. The first and second fly-eye lenses 23a, 23b include plural element lenses arranged in a matrix state respectively. Light passed through the parallelizing lens 22 is divided by element lenses included in the first fly-eye lens 23a to be individually gathered, and the divided light fluxes from the first fly-eye lens 23a are exited at appropriate divergence angels by the element lenses included in the second fly-eye lens 23b. The polarization conversion element 24 is formed in an array in which a PBS, a mirror, a retardation film and the like are a set of elements, having a function of aligning polarization directions of respective partial light fluxes divided by the first fly-eye lens 23a to straight-line polarization of one direction. The superimposing lens 25 allows illumination lights passed through the polarization conversion element 24 to appropriately converge as a whole to enable the liquid crystal light valves 40a, 40b and 40c which are light modulators of respective colors in later steps to perform superimposed illumination with respect to regions to be illuminated.

The color separation system 30 includes first and second dichroic mirrors 31a, 31b, reflection mirrors 32a, 32b and 32c, and three field lenses 33a, 33b and 33c, separating the illumination light uniformized by the illumination system 20 into three colors of red (R), green (G) and blue (B) as well as leading respective color lights to the liquid crystal light valves 40a, 40b and 40c in later steps. In more detail, first, the first dichroic mirror 31a transmits R-light and reflects G-light and B-light in three colors of RGB. The second dichroic mirror 31b reflects G-light and transmits B-light in two colors of GB. Next, in the color separation system 30, R-light transmitted through the first dichroic mirror 31a is incident in the field lens 33a for adjusting an incident angle through the reflection mirror 32a. The G-light reflected at the first dichroic mirror 31a and further reflected at the second dichroic mirror 31b is incident in the field lens 33b for adjusting an incident angle. Further, the B-light passed through the second dichroic mirror 31b is incident in the field lens 33c for adjusting an incident angle through relay lenses LL1, LL2 and the reflection mirrors 32b, 32c.

The liquid crystal light valves 40a, 40b and 40c are non-light emitting type light modulator modulating spatial intensity distribution of incident illumination light, including three liquid crystal panels 41a, 41b, and 41c illuminated respectively corresponding to respective colors exited from the color separation system 30, three first polarization filters 42a, 42b and 42c arranged at the incident side of the respective liquid crystal panels 41a, 41b and 41c and three second polarization filters 43a, 43b and 43c arranged at the exit side of the respective liquid crystal panels 41a, 41b and 41c. The R-light transmitted through the first dichroic mirror 31a is incident in the liquid crystal light valve 40a through the field lens 33a and the like, illuminating the liquid crystal panel 41a of the liquid crystal light valve 40a. The G-light reflected at both the first and second dichroic mirrors 31a, 31b is incident in the liquid crystal light valve 40b through the field lens 33b and the like, illuminating the liquid crystal panel 41b of the liquid crystal light valve 40b. The B-light reflected at the first dichroic mirror 31a and transmitted through the second dichroic mirror 31b is incident in the liquid crystal light valve 40c through the field lens 33c and the like, illuminating the liquid crystal panel 41c of the liquid crystal light valve 40c. Respective liquid crystal panels 41a to 41c modulate the partial intensity distribution of the incident illumination light in the polarization direction, polarization states of light of three colors respectively incident into respective liquid crystal panels 41a to 41c are adjusted in pixel units according to drive signals or image signals inputted to respective liquid crystal panels 41a to 41c as electrical signals. At this time, polarization directions of illumination light incident into respective liquid crystal panels 41a to 41c are adjusted by the first polarization filters 42a to 42c as well as modulated lights of given polarization directions are taken from modulated lights exited from respective liquid crystal panels 41a to 41c. According to the above, the respective liquid crystal valves 40a, 40b and 40c form image lights of respective colors corresponding to respective valves.

The cross dichroic prism 50 synthesizes image lights of respective colors from the respective liquid crystal light valves 40a, 40b and 40c. In more detail, the cross dichroic prism 50 has an approximately square shape in plan view in which four right-angle prisms are bonded together, and a pair of dielectric multilayer films 51a, 51b crossing in an X-shape are formed at interfaces where the right-angle prisms are bonded together. The first dielectric multilayer film 51a which is one of them reflects R-light and the other second dielectric multilayer film 51b reflects B-light. The cross dichroic prism 50 reflects R-light from the liquid crystal light valve 40a at the dielectric multilayer films 51a to allow the light to exit to the right side in the proceeding direction, allowing G-light from the liquid crystal light valve 40b to go straight and exit through the dielectric multilayer films 51a, 51b and reflects B-light from the liquid crystal light valve 40c at the dielectric multilayer film 51b to allow the light to exit to the left side in the proceeding direction. Accordingly, R-light, G-light and B-light are synthesized by the cross dichroic prism 50, as a result, synthesized light which is image light by a color image is formed.

The projection lens 60 is a projection system, projecting the color image on a screen (not shown) by magnifying the image light according to the synthesized light formed through the cross dichroic prism 50 at a desired magnification rate.

The invention is not limited to the above embodiment, capable of being performed in various manners in a range not departing from the gist thereof, and for example, the following modification can be performed.

For example, in the above embodiment, only the switching of operation conditions concerning the initial operations and the steady operation is explained, however, it is also possible to perform switching of operation conditions such as the electric current value or the triangular wave drive-up rate to be supplied to the discharge lamp 1 based on the accumulated lighting time or voltage data at the time of lighting also at the time of falling when the discharge lamp 1 is turned off.

In the above embodiment, the switching of operation conditions such as the electric current value or the triangular wave drive-up rate to be supplied to the discharge lamp 1 is performed based on the accumulated lighting time or voltage data at the time of lighting, however, it is also possible to monitor illuminance of the discharge lamp 1 by a photosensor such as a PD and to switch operation conditions such as the electric current value or the triangular wave drive-up rate according to the monitored results.

In the above embodiments the electric current value, the triangular wave drive-up rate to be supplied to the discharge lamp 1 and the like are used as operation conditions, and the switching to another operation conditions according to the state division is performed, however, it is also possible to perform switching to another operation conditions including the frequency, duty ratio and the like. For example, when the frequency is allowed to be reduced, electric power supplied in the latter half period of the half cycle in alternating current power is relatively increased. When the duty ratio at the side of the positive electrode is allowed to be increased, electric power supplied in the latter half period of the half cycle in alternating current power is relatively increased.

In the light source as described above, as a lamp used for the light source unit 10, various types of lumps such as a high-pressure mercury lamp or a metal halide lamp can be considered.

In the projector 200 of the above embodiment, the pair of fly-eye lenses 23a, 23b are used for dividing light from the light source 100 into plural partial luminous flux, however, the invention can be applied to a projector which does not use such fly-eye lens, namely, a lens array. Further, the fly-eye lenses 23a, 23b can be replaced with a rod integrator.

In the above projector 200, the polarization conversion element 24 which makes light from the light source 100 be polarized light in a specific direction is used, however, the invention can be applied to a projector which does not use such polarization conversion element 24.

Further, in the above embodiment, the example in which the invention is applied to a transmissive projector is explained, however, the invention can be also applied to a reflective projector. Here, "trasnmissive" means that the liquid crystal light valve including the liquid crystal panel and the like belongs to a type of transmitting light, and "reflective" means that liquid crystal light valve belongs to a type of reflecting light. The light modulator is not limited to the liquid crystal panel and the like, and for example, the light modulator may use a micromirror.

As a projector, there exist a front projector projecting images from the direction from which a projection surface is observed and a back projector projecting images from the opposite side of the direction from which the projection surface is observed, however, the configuration shown in FIG. 11 can be applied to both projectors.

In the above embodiment, only the example of the projector 200 using three liquid crystal panels 41a to 41c is cited, however, the invention can be applied to a projector using only one liquid crystal panel, a projector using two liquid crystal panels or a projector using four or more liquid crystal panels.

In the above embodiment, light modulations of respective colors is performed using the color separation system 30, the liquid crystal valves 40a, 40b and 40c and the like, however, instead of them, a color wheel illuminated by the light source 100 and the illumination system 20 is combined with a device including pixels of the micromirror, to which transmitted light of the color wheel is illuminated to thereby perform light modulation and synthesis of color.

The entire disclosure of Japanese Patent Application No. 2007-253627, filed Sep. 28, 2007 is expressly incorporated by reference herein.

What is claimed is:

1. A light source, comprising:
    an discharge lamp including a first electrode and a second electrode emitting light by discharge between them;
    a drive unit performing a steady operation which supplies steady energy to the first and second electrodes and an initial operation which supplies energy to the first and second electrodes with an operation different from the steady operation before performing the steady operation;
    a determination unit determining states of the discharge lamp; and
    a data storage unit storing plural initial power feeding conditions provided corresponding to states of the discharge lamp as examples of the initial operation and plural steady power feeding conditions provided corresponding to the states of the discharge lamp as examples of the steady operation; and
    wherein the drive unit performs the initial operation in any one of conditions selected from the plural initial power feeding conditions according to a determination result by the determination unit and performs the steady operation in any one of conditions selected from the plural steady power feeding conditions according to a determination result by the determination unit.

2. The light source according to claim 1,
    wherein the drive unit switches the initial operation and the steady operation according to the determination result by the determination unit independently.

3. The light source according to claim 1,
    wherein the plural initial power feeding conditions include plural stages corresponding to determination results by the determination unit, and when the initial operation is switched according to the determination result by the determination unit, supplying energy to be supplied to the first electrode and the second electrode respectively is changed.

4. The light source according to claim 3,
    wherein the plural initial power feeding conditions correspond to plural stages of deterioration of the discharge lamp, and
    wherein a current value of the initial power feeding condition corresponding to a higher stage of deterioration of the discharge lamp is smaller than a current value of the initial power feeding condition corresponding to a lower stage of deterioration of the discharge lamp in a period of a starting operation provided at the beginning of the initial operation.

5. The light source according to claim 3,
    wherein the initial operation includes a rising operation performed after the starting operation,
    wherein the plural initial power feeding conditions correspond to plural stages of deterioration of the discharge lamp, and
    wherein an increasing amount of a current value of the initial power feeding condition corresponding to a higher stage of deterioration of the discharge lamp is larger than the increasing amount of a current value of the initial power feeding condition corresponding to a lower stage of deterioration of the discharge lamp at the end of the rising operation period in the initial operations.

6. The light source according to claim 1,
    wherein the plural steady power feeding conditions correspond to plural stages of deterioration of the discharge lamp, and
    wherein electric power of the steady power feeding condition corresponding to a higher stage of deterioration of the discharge lamp is larger than electric power of the steady power feeding condition corresponding to a lower stage of deterioration of the discharge lamp, which is supplied in a latter half period of a half cycle in alternating-current power to be supplied to the first electrode and the second electrode respectively.

7. A projector, comprising:
the light source according to claim 1;
a light modulator illuminated by illumination light from the light source; and
a projection system projecting images formed by the light modulator.

8. The projector according to claim 7,
wherein the drive unit switches the initial operation and the steady operation according to the determination result by the determination unit independently.

9. The projector according to claim 7,
wherein the plural initial power feeding conditions include plural stages corresponding to determination results by the determination unit, and when the initial operation is switched according to the determination result by the determination unit, supplying energy to be supplied to the first electrode and the second electrode respectively is changed.

10. The projector according to claim 9,
wherein the plural initial power feeding conditions correspond to plural stages of deterioration of the discharge lamp, and
wherein a current value of the initial power feeding condition corresponding to a higher stage of deterioration of the discharge lamp is smaller than a current value of the initial power feeding condition corresponding to a lower stage of deterioration of the discharge lamp in a period of a starting operation provided at the beginning of the initial operation.

11. The projector according to claim 9,
wherein the initial operation includes a rising operation performed after the starting operation,
wherein the plural initial power feeding conditions correspond to plural stages of deterioration of the discharge lamp, and
wherein an increasing amount of a current value of the initial power feeding condition corresponding to a higher stage of deterioration of the discharge lamp is larger than the increasing amount of a current value of the initial power feeding condition corresponding to a lower stage of deterioration of the discharge lamp at the end of the rising operation period in the initial operations.

12. The projector according to claim 7,
wherein the plural steady power feeding conditions correspond to plural stages of deterioration of the discharge lamp, and
wherein electric power of the steady power feeding condition corresponding to a higher stage of deterioration of the discharge lamp is larger than electric power of the steady power feeding condition corresponding to a lower stage of deterioration of the discharge lamp, which is supplied in a latter half period of a half cycle in alternating-current power to be supplied to the first electrode and the second electrode respectively.

\* \* \* \* \*